US009276698B2

(12) United States Patent
Bontu et al.

(10) Patent No.: US 9,276,698 B2
(45) Date of Patent: Mar. 1, 2016

(54) DETERMINING HYBRID ARQ INDICATORS

(71) Applicant: BlackBerry Limited, Waterloo (CA)

(72) Inventors: Chandra Sekhar Bontu, Nepean (CA); Yi Song, Plano, TX (US); Zhijun Cai, Herndon, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 247 days.

(21) Appl. No.: 14/022,915

(22) Filed: Sep. 10, 2013

(65) Prior Publication Data

US 2015/0071183 A1    Mar. 12, 2015

(51) Int. Cl.
*H04L 1/00* (2006.01)
*H04L 1/18* (2006.01)

(52) U.S. Cl.
CPC .............. *H04L 1/00* (2013.01); *H04L 1/1861* (2013.01)

(58) Field of Classification Search
None
See application file for complete search history.

(56) References Cited

U.S. PATENT DOCUMENTS

| 2010/0267408 A1* | 10/2010 | Lee et al. ................ 455/509 |
| 2015/0029882 A1* | 1/2015 | Yang et al. ............... 370/252 |

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).
3GPP TS 36.211 V10.3.0 (Sep. 2011) Technical Specification: Evolved Universal Terrestrial Radio Access (E-UTRA); Physical Channels and Modulation (Release 10).

* cited by examiner

*Primary Examiner* — Ayaz Sheikh
*Assistant Examiner* — Tarell Hampton
(74) *Attorney, Agent, or Firm* — Fish & Richardson P.C.

(57) ABSTRACT

A system and method may provide user equipment (UE)-implemented inter-cell interference mitigation. In some implementations, a method in a user equipment for Hybrid Automatic Repeat Request (HARQ) indicator determination includes separating received Physical HARQ Indicator Channel (PHICH) modulation symbols into two data streams: (1) PHICH modulation symbols including interference from Cell-specific Reference Symbol (CRS) transmissions, and (2) PHICH modulation symbols including substantially no interference from the CRS transmissions. The UE separately evaluates the PHICH modulation symbols including interference and the PHICH modulation symbols including substantially no interference. The UE determines a Hybrid ARQ indicator based upon a combination of the separate evaluations of the PHICH modulation symbols including interference and the PHICH modulation symbols including substantially no interference.

17 Claims, 8 Drawing Sheets

DETERMINING HYBRID ARQ INDICATORS

FIELD

This disclosure relates to determining Hybrid Automatic Repeat Request (HARQ) indicators and interference mitigation.

BACKGROUND

In a Long Term Evolution (LTE) system, an evolved Node B (eNB) may receive data transmissions from user terminals or user equipments (UEs) and transmit one or more Hybrid Automatic Repeat Request (HARQ) indicators on Physical HARQ Indicator Channels (PHICHs). If a data transmission from a (UE) is successfully decoded, the eNB may set a HARQ indicator to acknowledgement (ACK). If a data transmission from a UE is not successfully decoded, the eNB may set a HARQ indicator to negative acknowledgment (NACK). The eNB may transmit the PHICHs in a Downlink (DL) channel to a UE. The UE may determine the HARQ indicator transmitted by the eNB.

In a typical HARQ process, if the UE determines that a HARQ indicator is a NACK, the UE may re-transmit the data. The UE may repeat this process until a HARQ indicator that represents an ACK is received or a maximum number of retransmissions is reached. Therefore, an erroneous determination of the HARQ indicator at the UE may affect the performance of the LTE system. If a NACK is mistakenly identified as an ACK, the UE may terminate the HARQ process prematurely and fail to deliver the data to the eNB. Conversely, if an ACK is mistakenly identified as a NACK, the UE may waste system resources by generating useless or unnecessary retransmissions and creating extra interferences.

DETAILED DESCRIPTION

Figure 1:
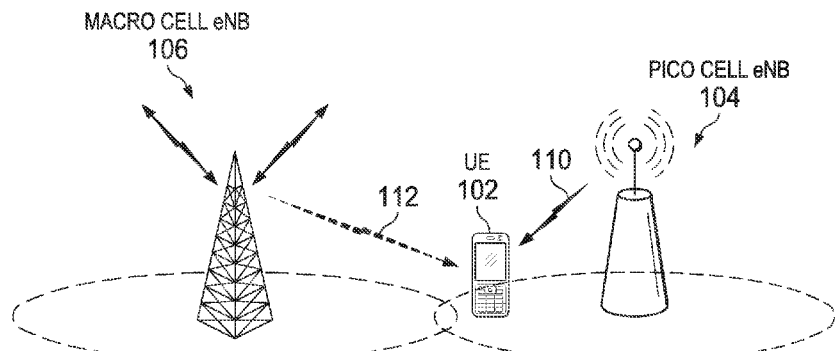
FIG. 1 an example wireless communication system for determining HARQ indicators.

The present disclosure is directed to multiple solutions for determining Hybrid Automatic Repeat Request (HARQ) indicators. Many of the examples provided in this disclosure are with respect to a 3GPP Long Term Evolution (LTE) based cellular network, also known as an Evolved Universal Terrestrial Radio Access (E-UTRA) based cellular network. However, the disclosed techniques are applicable to other existing cellular standards or other wireless networks having a dominant interference that affects the determination of HARQ indicators.

In a LTE system, an evolved Node B (eNB) may transmit a HARQ indicator on a Physical HARQ Indicator Channel (PHICH). Multiple PHICHs may map to the same set of resource elements. The PHICHs that map to the same set of resource elements constitute a PHICH group, where each PHICH within the PHICH group are separated by using a different Orthogonal Cover Code (OCC). The eNB may scramble and precode the PHICH group before transmitting the PHICHs to the UE.

In a typical LTE heterogeneous network deployment, where low-power cells may be added to an existing (and well-planned) macro cell network, the UEs which are connected to the LTE network via a low-power cell may experience significant interference from the macro cell transmissions. To alleviate this interference effects at the UEs which are associated with the low-power cells, almost blank subframes (ABS) may be configured at the macro cell. However, during the ABS transmission, the macro cell may still transmit the cell specific reference symbols at the same power level as in the other subframes.

The present embodiments may provide an advanced receiver at the UE which may suppress this type of interference efficiently. For instance, the present embodiments may provide a new receiver for detecting Physical HARQ Indicator Channel (PHICH) which may effectively reduce the effect of interference arising from the Cell-specific Reference Symbols (CRS) transmitted by the macro cell. A maximum likelihood (ML) receiver which operates on the odd symbols and even symbols of PHICH separately before combining the metrics together with appropriate scaling factor has been shown to perform very well.

In one aspect, a new reception scheme may be performed at the UE which may suppress the CRS interference from a macro cell. For instance, UEs at a pico cell boundary may experience high inter-cell interference levels, such as interference from a macro cell. Conventional techniques may have the macro cell/network attempt to reduce interference that the UE sees. However, such remotely operated techniques may be resource intensive. Thus, a solution locally implemented on the UE is provided by the present embodiments.

In general, a new Maximum Likelihood (ML) detector with reduced states may be derived. The number of states of the ML detector may be reduced by exploiting the OCC properties. Further, the subtle changes to the architecture of the UE are suggested so that the receiver performs well in the presence of CRS interference. Specifically, the UE receiver may separately evaluate (1) the PHICH modulated symbols that are interfered by the CRS transmission, and (2) the PHICH modulated symbols that are not interfered by the CRS transmission. The information obtained from these separate evaluations may be combined after scaling them appropriately (using appropriate scaling factors). The UE may easily identify the PHICH modulated symbols which are CRS interfered by relative comparison of the received powers over different modulation symbols.

I. Exemplary Communication System

FIG. 1 is an example wireless communication system 100 for determining HARQ indicators. For example, in a LTE system, a user equipment (UE) may implement a method to determine a HARQ indicator by separating received PHICH modulation symbols into two data streams: (1) PHICH modulation symbols including interference from Cell-specific Reference Symbol (CRS) transmissions, and (2) PHICH modulation symbols including substantially no interference from the CRS transmissions. The UE may separately evaluate the PHICH modulation symbols including interference and the PHICH modulation symbols including substantially no interference. The UE may determine a HARQ indicator based upon a combination of the separate evaluations of the PHICH modulation symbols including interference and the PHICH modulation symbols including substantially no interference.

Using the method as described in this disclosure to determine a HARQ indicator may provide one or more advantages. For example, the method improves the performance of HARQ indicator determination in the presence of CRS interferences. Performance improvement of HARQ indicator determination at the UE helps to avoid loss of data or waste of system resource. Consequently, the method improves both experiences of individual users and overall performance of the system.

In some implementations, a UE evaluates the PHICH modulation symbols in each data stream by generating outputs based on the PHICH modulation symbols in the respective data stream and a predetermined OCC for the UE. The UE may determine a HARQ indicator based on the generated outputs and a reduced set of hypothesis values. This method reduces the number of hypothesis values by exploiting OCC properties. This provides one or more advantages. For example, this reduces processing complexities and memory requirement of a UE.

Figure 4:
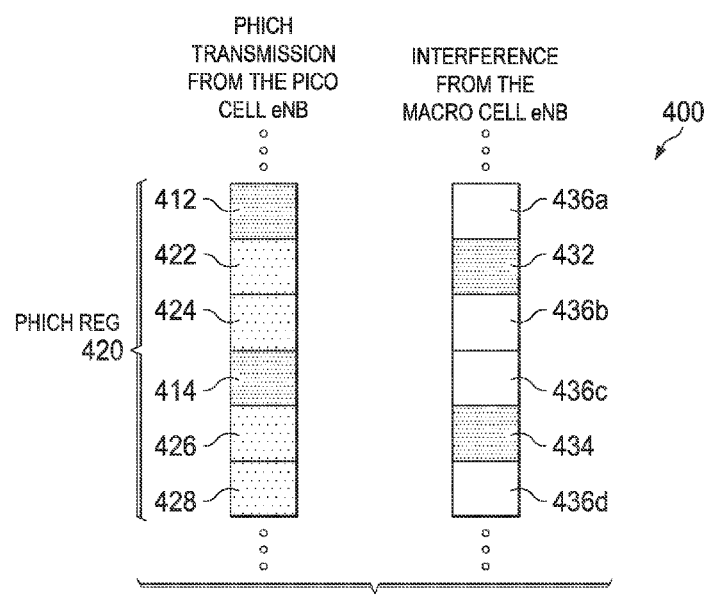
FIG. 4 is a schematic illustrating example interference from a macro cell eNB to PHICH transmissions from a Pico cell eNB.

At high level, the wireless communication system 100 includes a UE 102 communicably coupled to a pico cell eNB 104 in a LTE network. The pico cell eNB 104 transmits signals to the UE 102 using Downlink (DL) channels. One of the DL channels is a PHICH group 110, which carries HARQ indicators. The signal reception quality of the PHICH group 110 at the UE 102 is affected by interferences in the system. One source of the interferences is transmissions by neighboring eNBs. For example, in a deployment of a heterogeneous network, a macro cell eNB 106 transmits Cell-Specific Reference Symbols (CRS) 112, which generates a dominant interference to the reception of the PHICH group 110 at the UE 102. FIG. 4 and associated description provide additional details of these implementations.

Figure 8:
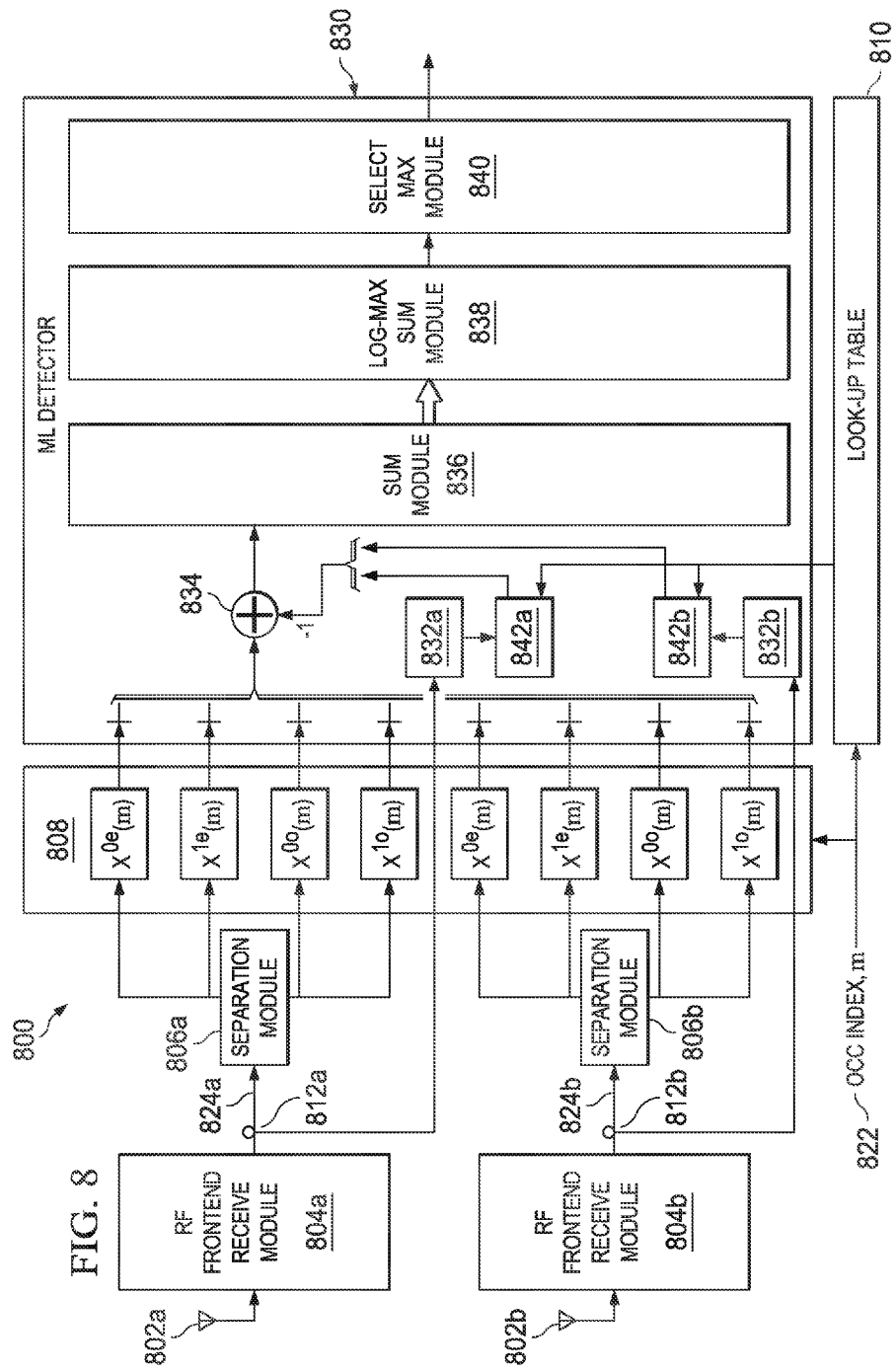
FIG. 8 is a schematic illustrating an example HARQ indicator determination model that separates received PHICH modulation symbols and evaluates them separately.

The UE 102 can include any software, hardware, or firmware that determines HARQ indicators. In some implementations, the UE 102 determines HARQ indicators by separating PHICH modulation symbols into two data streams: (1) PHICH modulation symbols including interference from CRS 112, and (2) PHICH modulation symbols including substantially no interference from CRS 112. This enables the UE 102 to separately evaluate PHICH modulation symbols in these two data streams and improve the performance of the HARQ indicator determination. FIG. 8 and associated description provide additional details of these implementations.

Turning to a general description of the elements, the UE 102 may be referred to as mobile electronic device, user device, mobile station, subscriber station, portable electronic device, mobile communications device, wireless modem, or wireless terminal. Examples of the UE 102 may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. A UE may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, a UE may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein. The term UE may include hand-held wireless communication devices, mobile devices, cell phones, smart phones, tablets, laptops, notebooks, personal data assistants (PDAs), and/or other wireless communication devices.

An eNB (e.g., the pico cell eNB 104 or the macro cell eNB 106) can be a radio base station that may control all or at least some radio related functions in a fixed part of the system. An eNB can provide radio interface within their coverage area or a cell for UEs to communicate. eNBs may be distributed throughout the cellular network to provide a wide area of coverage. An eNB directly communicate with one or more UEs, other eNBs, and the core network.

In the illustrated example, a pico cell eNB 104 is an eNB that typically covers a small area and transmits DL channels with a small power, while a macro cell eNB 106 is an eNB that typically covers a bigger area and thus transmits its signals with more power. When both the pico cell eNB 104 and the macro cell eNB 106 transmit their signals concurrently on the same time-frequency resources, the signals transmitted by the macro cell eNB 106 become interference to the signals transmitted by the pico cell eNB 104. While the macro cell eNB 106 may turn off its DL transmission in a data region for certain subframes (e.g., Almost Blank Subframes) to reduce interference, the macro cell eNB 106 will continuously transmit the CRS 112 in these subframes. Thus for the UE 102, the CRS 112 becomes a dominant interference to reception of the PHICH group 110 transmitted by the pico cell eNB 104.

II. Exemplary Transmitter

Figure 2:
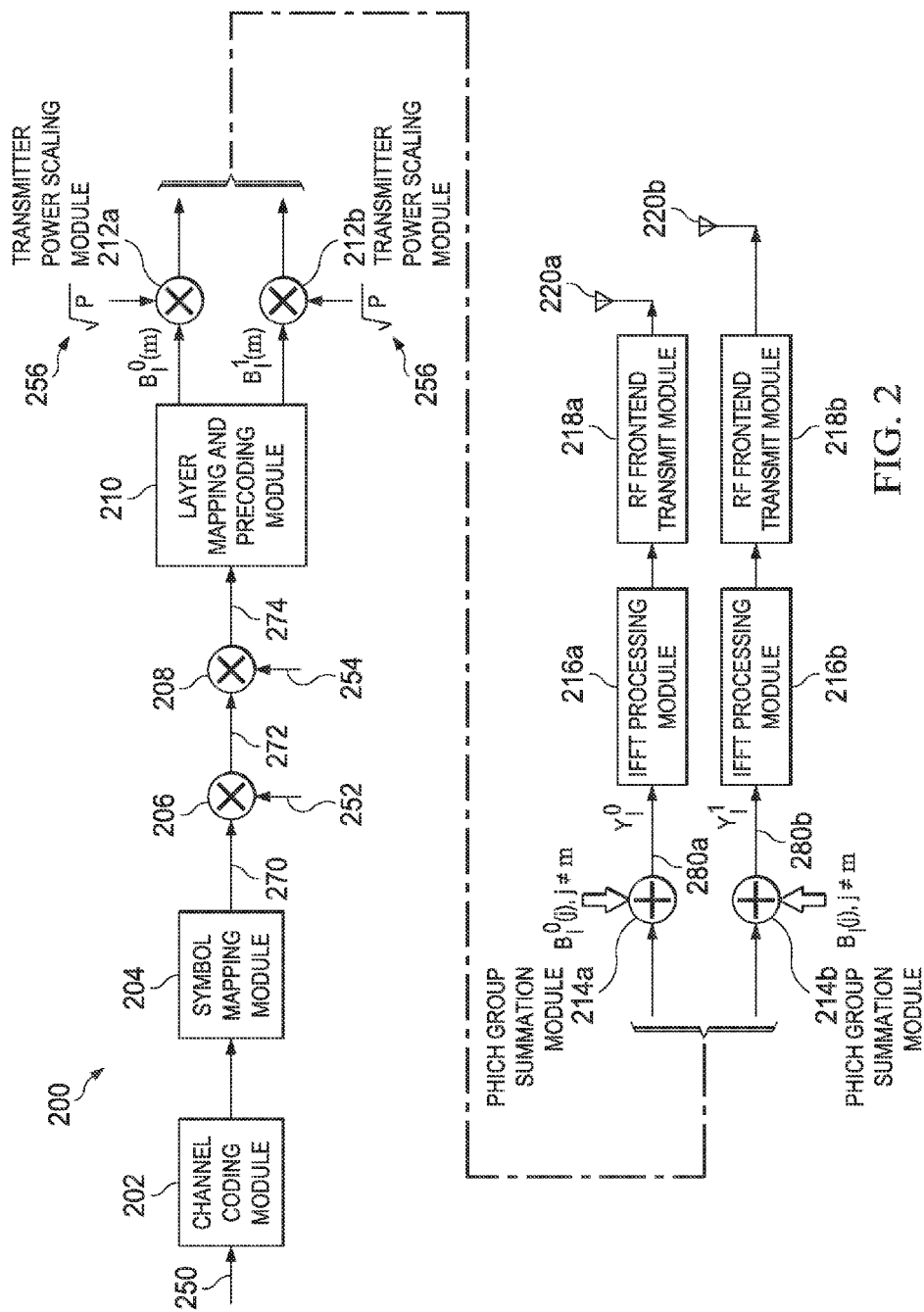
FIG. 2 is an example transmitter for transmitting HARQ indicators.

FIG. 2 is a schematic illustrating an example HARQ indicator transmitter 200. The example HARQ indicator transmitter 200 can include any software, hardware, or firmware that transmits HARQ indicators. For example, a pico cell eNB may use the example HARQ indicator transmitter 200 to transmit a HARQ indicator 250 to a UE. As illustrated, the example HARQ indicator transmitter 200 includes a channel coding module 202, a symbol mapping module 204, an OCC spreading module 206, a scrambling module 208, a layer mapping and precoding module 210, transmitter power scaling modules 212a and 212b, PHICH group summation modules 214a and 214b, inverse fast Fourier transform (IFFT) processing modules 216a and 216b, RF front end transmit modules 218a and 218b, and transmit antennae 220a and 220b.

An eNB typically generates HARQ indicator 250 based on the result of decoding an uplink (UL) data transmission from a UE. If the decoding is successful, the eNB sets the HARQ indicator 250 to ACK; if the decoding is not successful, the eNB sets the HARQ indicator 250 to NACK.

In the illustrated example, the channel coding module 202 applies channel coding to the HARQ indicator 250. One example of the channel coding techniques is a rate-1/3 repetition code, which generates three HARQ coded bits by repeating the HARQ indicator 250 three times. Each of the three HARQ coded bits may be transmitted over a different Resource Element Group (REG). The symbol mapping module 204 maps the HARQ coded bits to HARQ symbols 270. A HARQ symbol may take one of three states. For example, if the HARQ indicator 250 is an ACK, then each HARQ coded bit may map to 1. If the HARQ indicator 250 is an NACK, then each HARQ coded bit may map to −1. If there is no HARQ indicator to be transmitted to a UE in a subframe, then each HARQ coded bit may map to 0. The HARQ symbols 270, denoted as $A_l(m)$, may be expressed in the following equation:

$$A_l(m)=D_m \text{ for } l=l_0, l_1, l_2,$$

where $D_m \in \{-1, 0, 1\}$, and $l_0, l_1, l_2$ indicate the indices of the REGs.

The OCC spreading module 206 may spread the HARQ symbols 270 to generate spreaded HARQ sequence 272. In particular, each of the HARQ symbols 270 is symbol-wise multiplied with an OCC 252. 3GPP LTE standards define OCC matrices to include OCCs that may be used for spreading. Depending on the cyclic prefix used in a LTE system, different OCC matrix may be used. In the illustrated example, the LTE system uses Normal Cyclic Prefix, therefore the OCC matrix, denoted as E, is based on a 4×4 Hadamard matrix and can be expressed in the following equation:

$$E = [H_{4\times 4} \quad jH_{4\times 4}] \text{ where,}$$

$$H_{4\times 4} = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

A LTE system may also use Extended Cyclic Prefix, which uses a 2×2 Hadamard matrix to form the OCC matrix instead of a 4×4 Hadamard matrix.

In the illustrated example, each column of the OCC matrix E specifies an OCC. For any UE at any subframe, the OCC 252 used to spread the HARQ symbols 270 may be predetermined. For example, an OCC may be implicitly assigned to a UE in an Uplink (UL) grant. When an eNB transmits an UL grant to a UE, the lowest Resource Block (RB) index of the UL grant indicates the index of the OCC to be used. The following equation describes the spreaded HARQ sequence 272, denoted as $G_l^0(m)$:

$$G_l^0(m)=D_m X^0(m) \text{ for } l=l_0, l_1, l_2,$$

where $X^0(m)$ denotes the OCC 252 used for the UE-m, which corresponds to the m-th column of the OCC matrix E.

The scrambling module 208 scrambles the spreaded HARQ sequence 272 by a cell specific scrambling sequence 254 to generate scrambled HARQ sequence 274. The following equation describes the scrambled HARQ sequence 274, denoted as $B_l^0(m)$:

$$B_l^0(m) = U_l G_l^0(m) \text{ where}$$

$$U_l = \begin{bmatrix} U_l(0) & 0 & 0 & 0 \\ 0 & U_l(1) & 0 & 0 \\ 0 & 0 & U_l(2) & 0 \\ 0 & 0 & 0 & U_l(3) \end{bmatrix},$$

and $U_l(i)$ is the ith bit of the cell specific scrambling sequence over lth REG.

An eNB may use Multiple Input Multiple Output (MIMO) techniques to transmit PHICHs over multiple antennae. The layer mapping and precoding module 210 maps the scrambled HARQ sequence 274 to multiple layers and multiplies the mapping with a precoding matrix. In the illustrated example, an eNB uses Space-Frequency Block Coding (SFBC) as the Single Input Multiple Output SIMO technique to transmit PHICHs over, for example, two transmit antennas. The following equation describes the SFBC coded version of the OCC 252:

$$X^1(m)=[-X_1^{0*}(m)X_0^{0*}(m)-X_3^{0*}(m)X_2^{0*}(m)]^T,$$

where $X^0(m)$ denotes the OCC 252 and $X^1(m)$ denotes the SFBC coded version of the OCC 252.

In the illustrated example, the layer mapping and precoding module 210 maps the scrambled HARQ sequence 274 to two layers and generates the SFBC coded version of the scrambled HARQ sequence based on the following equation:

$$B_l^1(m)=U_l D_m X^1(m),$$

where $B_l^1(m)$ denotes the SFBC coded version of the scrambled HARQ sequence.

An eNB may use other number of antennae and MIMO techniques. For example, an eNB can use four antennae to transmit PHICH. In that case, the eNB may map the scrambled HARQ sequence 274 to four layers and use a 4×4 SFBC matrix to generate three additional SFBC coded versions of the scrambled HARQ sequence. An eNB may also use one single antenna to transmit PHICHs, without using any MIMO techniques. In such a case, the eNB can bypass the layer mapping and precoding module 210.

The transmitter power scaling modules 212a and 212b scale the transmit power for the PHICH of the UE. In the illustrated example, the same scaling factor is assumed for both antennae. In particular, the transmitter power scaling module 212a applies a scaling factor 256, denoted as $\sqrt{P}$, to the scrambled HARQ sequence 274, while the transmitter power scaling module 212b applies the scaling factor 256 to the SFBC coded version of the scrambled HARQ sequence.

As previously mentioned, PHICHs for multiple UEs can form a PHICH group and map to the same set of resource elements. In a LTE system, a PHICH group can include up to eight PHICHs, where each PHICH transmits the scaled scrambled HARQ sequence 274 for one UE. The PHICH group summation module 214a adds the scaled scrambled HARQ sequence for all the UEs in a PHICH group to generate PHICH modulation symbols for antenna-0 280a. Similarly, the PHICH group summation module 214b adds the scaled SFBC coded version of the scrambled HARQ sequence for all the UEs in a PHICH group to generate PHICH modulation symbols for antenna-1 280b. In the illustrated example, provision for different power scaling factor is assumed for all the UEs in a PHICH group. Alternatively, the same power scaling factor can be used. When the same power scaling factor is used, the transmitter power scaling modules, 212a and 212b are performed after the PHICH summation modules 214a and 214b respectively.

The following equations describes the PHICH modulation symbols 280a and 280b, denoted as $Y_l^0$ and $Y_l^1$, respectively (here the same power scaling is assumed for all the UEs):

$$Y_l^0 = \sum_{i=0}^{7} \sqrt{P} B_l^0(i)$$

$$Y_l^1 = \sum_{i=0}^{7} \sqrt{P} B_l^1(i)$$

The following equation describes the PHICH modulation symbols in a composite form. The PHICH modulation symbols for the lth REG are denoted as $Y_l$.

$$Y_l = \sqrt{P} [\Sigma_{i=0}^{7} B_l^0(i) \Sigma_{i=0}^{7} B_l^1(i)]^T$$

The IFFT processing modules 216a and 216b use IFFT transformation to generate baseband signals for each transmit antenna. The IFFT processing modules 216a and 216b may include digital signal processing (DSP) circuitries. Prior to performing IFFT of the OFDM symbols, the $Y_l$ are mapped to the appropriate physical radio resources, i.e., REGs as described earlier. Though, the mapping function may be performed by separate module without departing from the scope of the disclosure.

The RF front end transmit modules 218a and 218b may convert the baseband signals into passband signals. The components of the RF front end transmit modules 218a and 218b may include digital-to-analog converter, amplifiers, frequency filters, oscillators, and other elements.

The transmit antennae 220a and 220b transmit the passband signals to the UE. The transmit antennae 220a and 220b are generally responsible for transmissions of radio waves and may serve as interfaces between an eNB and a wireless channel. The transmit antennae 220a and 220b may be transducers which can transmit electromagnetic waves. The transmit antennae 220a and 220b can convert electric current into electromagnetic radiation.

III. Exemplary Subframe

Figure 3:
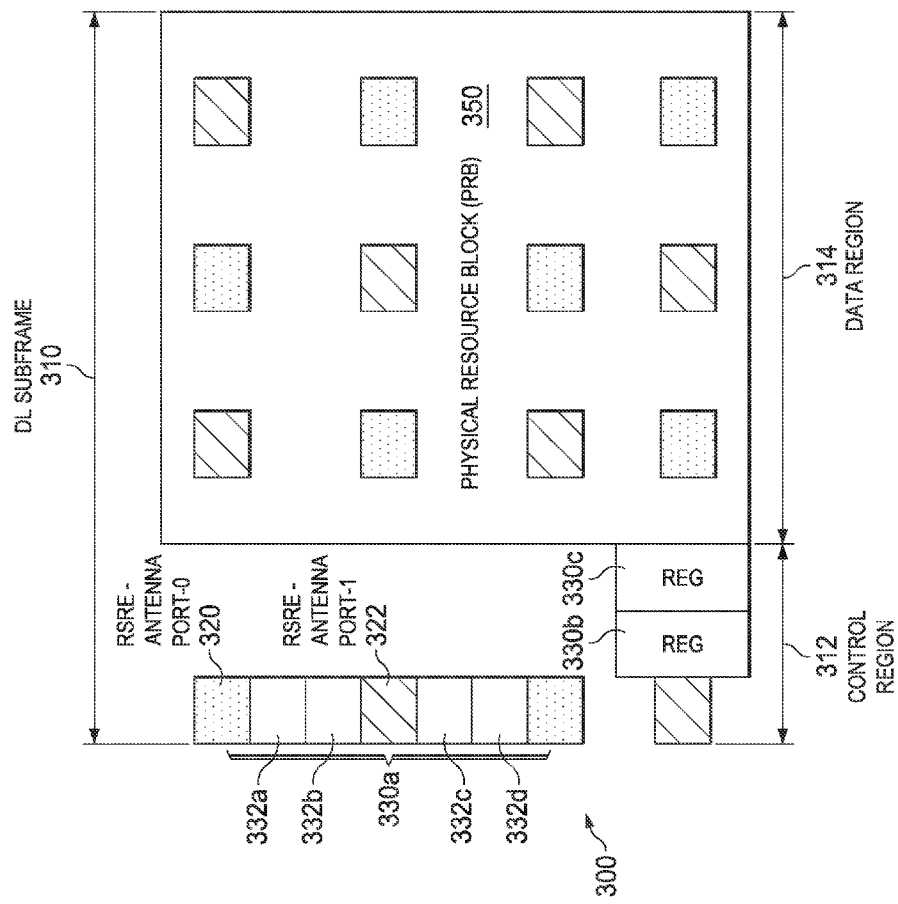
FIG. 3 is an example of a Downlink subframe.

FIG. 3 is a schematic 300 illustrating an example DL subframe 310. The example DL subframe 310 includes a control region 312 and a data region 314. In a LTE system, a resource element (RE) represents one sub-carrier in one OFDM symbol. A control region typically includes all the REs in the first one to four OFDM symbols in a DL subframe. A data region includes REs in the remaining OFDM symbols in the DL subframe. In the illustrated example, the control region 312 includes REs in the first three OFDM symbols of the example DL subframe 310. An eNB uses the control region 312 to transmit control information, including PHICHs. The data region 314 includes REs in the remaining OFDM symbols of the example DL subframe 310. An eNB uses the data region 314 to transmit data information.

The REs in the control region 312 are organized into resource element groups (REGs). A REG may include four or six REs, depending on the OFDM symbol index, the number of transmit antennae, and other factors. In the illustrated example, an eNB uses REGs 330a, 330b, and 330c to transmit a PHICH group. In the illustrated example, the eNB uses two transmit antennas. The REG 330a includes six REs in the first OFDM symbols. In particular, the eNB includes Reference Symbol RE for antenna port-0 320, Reference Symbol RE for antenna port-1 322, and four PHICH REs 332a, 332b, 332c, and 333d. The reference symbol RE for antenna port-0 320 is one of the reference symbol REs that an eNB uses to transmit reference symbol for antenna port 0 in the example DL subframe 310. The reference symbol RE for antenna port-1 322 is one of the reference symbol REs that the eNB uses to transmit reference symbol for antenna port 1 in the example DL subframe 310. The PHICH REs 332a, 332b, 332c, and 332d are used to transmit PHICH modulation symbols for the first REG. The REG 330b includes 4 PHICH REs in the second OFDM symbols and is used to transmit PHICH modulation symbols for the second REG. The REG 330c includes 4 PHICH REs in the third OFDM symbols and is used to transmit PHICH modulation symbols for the third REG.

The data region 314 typically includes more than one Physical Resource Blocks (PRBs). In the illustrated example, a PRB 350 includes twelve subcarriers for each of the eleven OFDM symbols in the data region 314. Similar to the control region 312, the data region 314 may be include the reference symbol REs that are used to transmit reference symbols for each antenna.

IV. Exemplary Interference from Macro Cell

FIG. 4 is a schematic 400 illustrating example interference from a macro cell eNB to PHICH transmissions from a Pico cell eNB. As previously mentioned, transmission of a macro cell eNB may generate interference to concurrent transmissions of PHICHs from a Pico cell eNB. Because the macro cell eNB transmits signals at a higher power than the pico cell eNB, the interference may be high for a UE that is located at the cell edge of the Pico cell eNB. To manage interference, a LTE system may use Almost-Blank-Subframe (ABS) techniques. An ABS is a subframe which is transmitted at a low average-transmit power compared to other subframes. In particular, some of the subframes from a Macro cell eNB can be configured as ABSs to reduce interference to UEs in a neighboring Pico cell. A Pico cell eNB may transmit to cell-edge UEs subframes that are concurrently transmitted with the ABSs in the Macro cell. However, even during ABSs, a Macro cell eNB continues to transmit CRS at the same power level as the other subframes. Therefore, during these subframes, even though the average inter-cell interference experienced by a cell-edge UE connected to a Pico cell eNB is low, some REs still experience substantial interference from the CRS transmissions of a Macro cell eNB.

In the illustrated example, a PHICH REG 420 is one of the REGs that are used by a Pico cell eNB to transmit PHICHs. As mentioned previously, there are four PHICH REs used to transmit PHICH modulation symbols in the REG 420. In particular, each of PHICH REs 422, 424, 426, and 428 transmits one PHICH modulation symbols in the REG 420 in a sequential order. If an eNB uses two transmit antennae, it may configure reference symbol REs to transmit reference symbols for each antenna. In the illustrated example, a Pico cell eNB uses Pico cell Reference Symbol RE for antenna port-0 412 to transmit a reference symbol for antenna port 0, and uses Pico cell Reference Symbol RE for antenna port-1 414 to transmit a reference symbol for antenna port 1.

The PHICH REG 420 experiences interference from the concurrent transmissions of a neighboring Macro cell eNB at REs 436a, 436b, 436c, 436d, 432, and 434. In the illustrate example, the DL subframe in the Macro cell is configured as ABS. As a result, the Macro cell eNB transmits at a reduced power or no power in REs 436a, 436b, 436c, and 436d. On the other hand, the Macro cell eNB continues to transmit CRS at non-reduced power level. In the illustrated example, the Macro cell eNB uses two antennae to transmit and thus transmits two CRSs. The Macro cell eNB uses Macro cell Reference Symbol RE for antenna port-0 432 to transmit a reference symbol for antenna port 0 of the Macro cell eNB and uses Macro cell Reference Symbol RE for antenna port-1 434 to transmit a reference symbol for antenna port 1 of the Macro cell eNB. As a result, the PHICH REs 422 and 426, where the first and third PHICH modulation symbols in the PHICH REG 420 are transmitted, include interference from the CRS transmissions. The PHICH REs 424 and 428, where the second and fourth PHICH modulation symbols in the PHICH REG 420 are transmitted, include substantially no interference from the CRS transmissions.

In some implementations, the PHICH transmission from the Pico cell eNB may have a different alignment with the concurrent CRS transmission from the Macro cell eNB. For example, the CRS transmission from the Macro cell eNB may shift by one subcarrier downwards comparing to the illustrated example. In that case, the Macro cell Reference Symbol RE for antenna port-0 432 is transmitted at the same subcarrier as the PHICH RE 424, and the Macro cell Reference Symbol RE for antenna port-1 434 is transmitted at the same subcarrier as the PHICH RE 428. In that case, the PHICH REs 424 and 428, where the second and fourth PHICH modulation symbols in the PHICH REG 420 are transmitted, include interference from the CRS transmissions. The PHICH REs 422 and 426, where the first and third PHICH modulation symbols in the PHICH REG 420 are transmitted, include substantially no interference from the CRS transmissions. In some cases, some or all of the PHICH REGs may fall in the second and third or fourth OFDM symbols. In these cases the REs which are interfered by the CRS transmission from an adjacent cell varies. If the some or all of the REGs fall in the third and four OFDM symbols, none of the PHICH REs will be affected by the CRS transmissions from the neighbor cell. If the some or all of the REGs fall in the second OFDM symbols the PHICH REs are interfered only if the neighbor cells transmits using more than two transmit antennas. In either of these cases, the approach to determine the Hybrid indicator bit involves all the PHICH REs which are interfered by the CRS transmission and the other PHICH REs are affected by substantially no interference are processed separately and combined appropriately.

V. Exemplary Maximum Likelihood Detection Technique

Figure 5A:
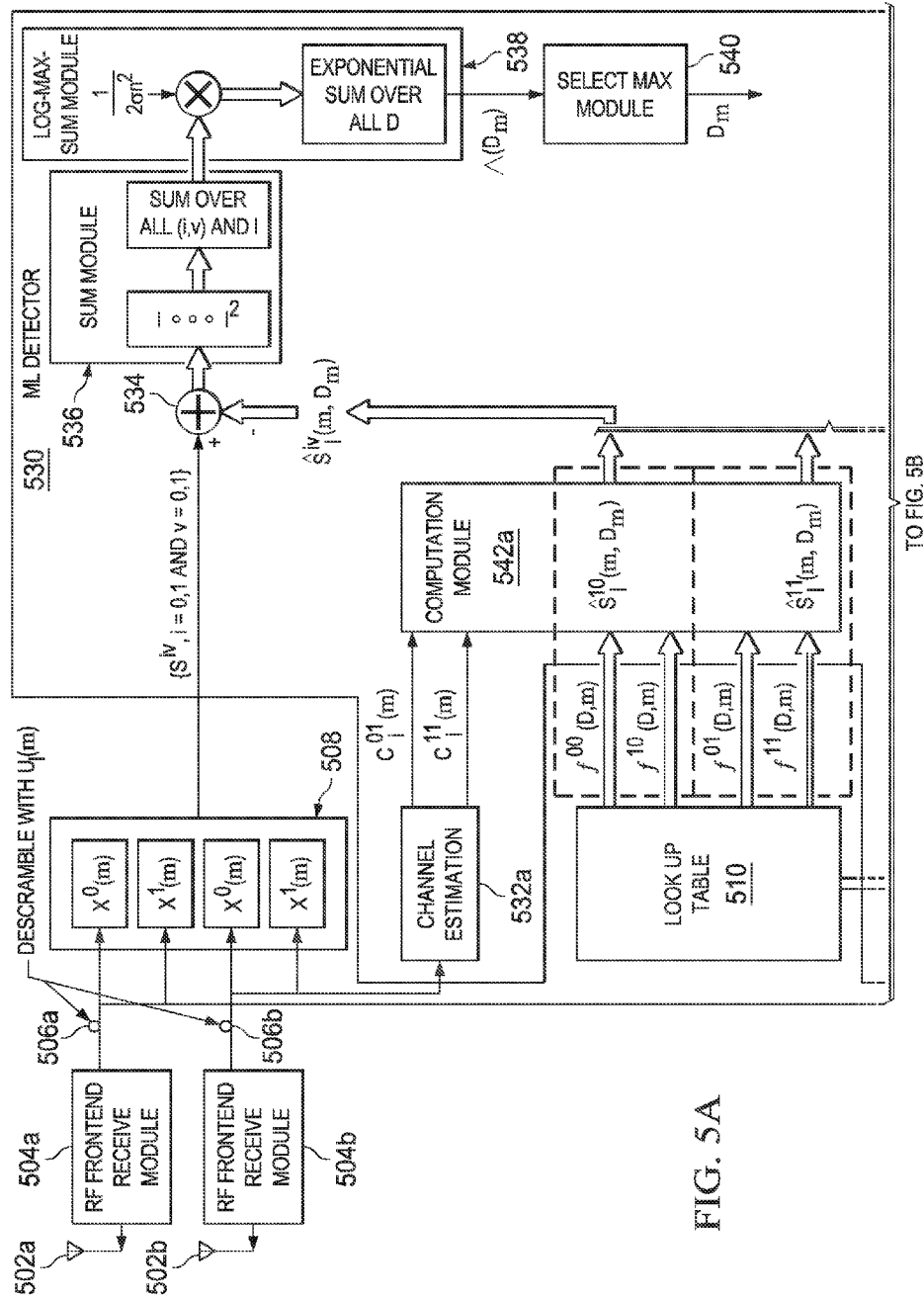
FIGS. 5A-5B are a schematic illustrating an example HARQ indicator determination model.
Figure 5B:
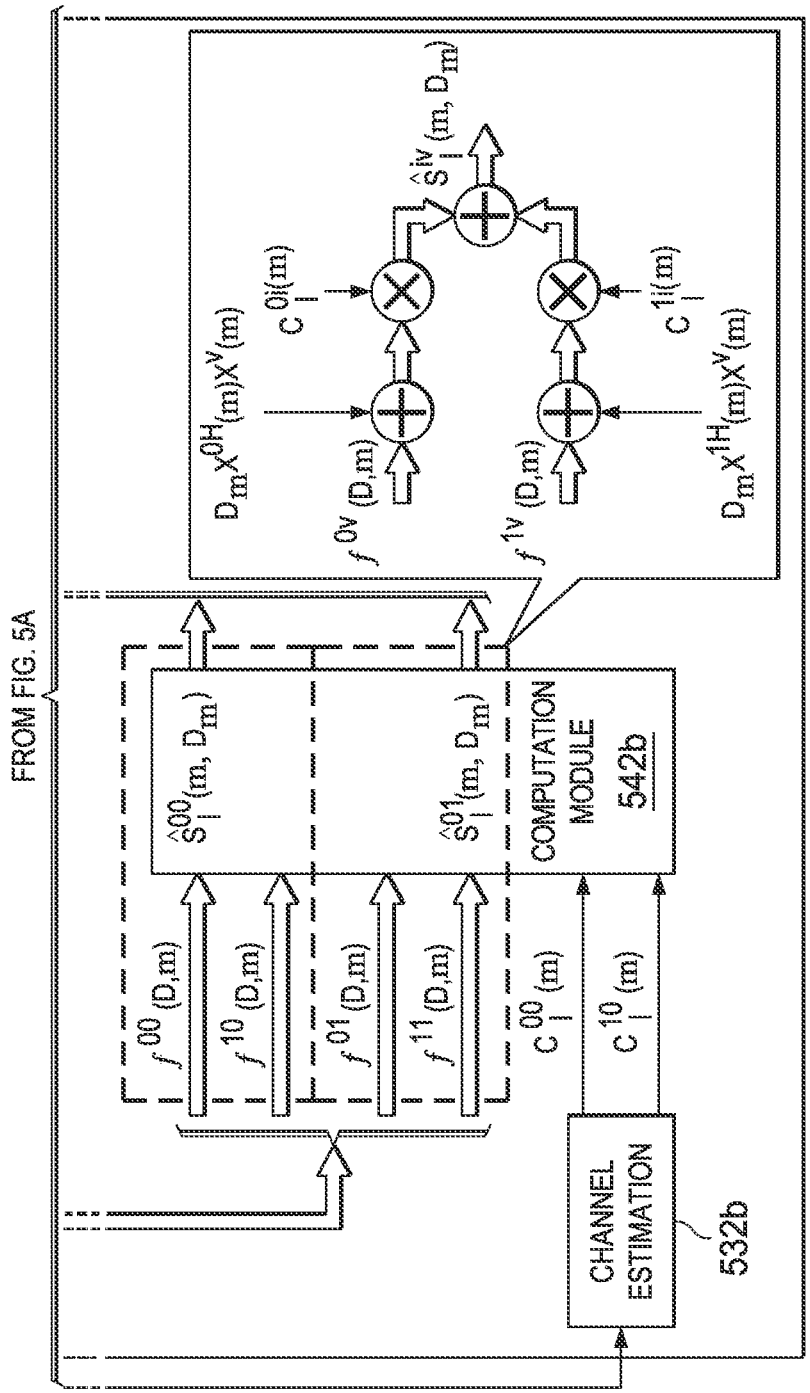

FIGS. 5A-5B are a schematic 500 illustrating Maximum likelihood detection of PHICH for UE-m. A UE may use the example Maximum likelihood detection to determine a HARQ indicator. The example Maximum likelihood detection technique can include any software, hardware, or firmware that determines HARQ indicators. In the illustrate example, the schematic 500 includes receive antennae 502a and 502b, RF front end receive modules 504a and 504b, descramble modules 506a and 506b, an evaluation module 508, a look-up table 510, and a Maximum likelihood (ML) detector 530.

In the illustrated example, the receive antennae 502a and 502b receive DL signals transmitted by a Pico cell eNB. The receive antennae 502a and 502b are configured to receive radio waves and can serve as interfaces between a UE and the wireless channel. The receive antennae 502a and 502b may be transducers which can receive electromagnetic waves. The receive antennae 502a and 502b can convert electromagnetic radiation into electric current. A UE may use other number of receive antennae to receive DL signals and include a different number of modules in the schematic 500 without departing from the scope of the disclosure. For example, if a UE uses four receive antennae, then the UE may include four RF front end receive modules and four descramble modules.

The RF front end receive modules 504a and 504b covert received signals into baseband signals and apply FFT process. The components of the RF front end receive modules 504a and 504b may include analog-to-digital converters, amplifiers, frequency filters, oscillators, and digital signal processing (DSP) circuitries. The following equation describes the output signals of 504a and 504b, denoted as $R_l^i(m)$, where i indicates the indices of the receive antenna.

$$R_l^i(m) = C_l^i(m) Y_l + N_l^i(m) \text{ for } l = l_0, l_1, l_2,$$

where $l_0, l_1, l_2$ indicate the indices of the REGs, $N_l(m)$ denotes the noise vector, $Y_l$ denotes the transmitted PHICH modulation symbols.

In particular, $$Y_l = \begin{bmatrix} Y_l^0 \\ Y_l^1 \end{bmatrix},$$

where $Y_l^j$ is the transmit signal from the jth antenna and is given as follows:

$$Y_l^j = [Y_{l(0)}^j Y_{l(1)}^j Y_{l(2)}^j Y_{l(3)}^j]^T,$$

where $Y_{l(k1)}^j$ represents the kith PHICH RE in the lth PHICH REG.

$$C_l(m) = \begin{bmatrix} C_l^{00}(m)_{4\times 4} & C_l^{10}(m)_{4\times 4} \\ C_l^{01}(m)_{4\times 4} & C_l^{11}(m)_{4\times 4} \end{bmatrix}$$

where $C_l^{li}(m)$ represents the channel vector with channel weights from the lth eNB transmit antenna to the $i^{th}$ receive antenna of UE-m, and is defined as the following:

$$C_l^{li}(m) = \begin{bmatrix} C_{l(0)}^{li} & 0 & 0 & 0 \\ 0 & C_{l(1)}^{li} & 0 & 0 \\ 0 & 0 & C_{l(2)}^{li} & 0 \\ 0 & 0 & 0 & C_{l(3)}^{ji} \end{bmatrix}$$

In general, $C_{l(0)}^{li} = C_{l(1)}^{li}$ and $C_{l(2)}^{li} = C_{l(3)}^{li}$ for two-branch transmit diversity to work. For simplicity we assume here that all the channel weights over the REG are equal, i.e., $C_{l(0)}^{li} = C_{l(1)}^{li} = C_{l(2)}^{li} = C_{l(3)}^{li} = C_l^{li}$;

Therefore, $C_l^{li}(m) = C_l^{li}(m) I_{4\times 4}$

The descramble modules 506a and 506b use the cell specific scrambling sequence $U_l$ to descramble $R_l^i(m)$ to generate received PHICH modulation symbols, which can be represented as $$R_l^{iH}(m) \begin{bmatrix} U_l & 0 \\ 0 & U_l \end{bmatrix}.$$

In the illustrated example, the evaluation module 508 evaluates received PHICH modulation symbols by passing them through a filter bank. As mentioned previously, in the illustrated example, the Pico cell eNB uses SFBC to transmit PHICHs over two transmit antennae, thus the filter bank includes filters that are matched to $X^0(m)$ and $X^1(m)$, respectively. $X^0(m)$ denotes the predetermined OCC for the UE-m, where m denotes the index of the predetermined OCC in the OCC matrix E. $X^1(m)$ denotes the SFBC coded version of the predetermined OCC. $X^0(m)$ and $X^1(m)$ can be represented as $X^v(m)$, where v indicates the indices of the transmit antenna and v=0, 1. The following equation describes the outputs of the evaluation module 508, denoted as $S_l^{iv}(m)$:

$$S_l^{iv}(m) = R_i^{iH}(m)\begin{bmatrix} U_l & 0 \\ 0 & U_l \end{bmatrix} X^v(m)$$

By substituting for $R_i^{iH}(m)$ from the previous sections, this equation can be further simplified as follows:

$$S_l^{iv}(m) = R_i^{iH}(m)\begin{bmatrix} U_l & 0 \\ 0 & U_l \end{bmatrix} X^v(m)$$

$$= \sqrt{P}\sum_{k=0}^{7} D_k \sum_{\ell} C_l^{\ell iH}(m) X^{\ell H}(k) X^v(m) + N_l^{iH}(m) X^v(m)$$

$$S_l^{iv}(m) =$$

$$\sqrt{P}\sum_{\ell} C_l^{\ell iH}(m)\left\{\sum_{\substack{k=0\\k\neq m}}^{7} D_k X^{\ell H}(k) X^v(m) + D_m X^{\ell H}(m) X^v(m)\right\} + N_l^{iv}(m),$$

where $$N_l^{iv}(m) = N_l^{iH}(m) X^v(m) \forall\, i, v.$$

$N_l^{iv}(m)$ are zero mean i.i.d. Gaussian noise variables with variance $\sigma_n^2$. This follows from the fact that the receiver branches on each antenna are well balanced and the filters $X^v(m)$ are orthogonal with equal power.

In the illustrated example, the ML detector 530 determines a HARQ indicator for the UE-m based on $S_l^{iv}(m)$ and a set of hypothesis values from the look-up table 510. The ML detector 530 includes channel estimation modules 532a and 532b, computation modules 542a and 542b, an adder modulation 534, a sum module 536, a log-max-sum module 538, and a select max module 540.

The channel estimation modules 532a and 532b estimate the channel between lth transmit antenna and ith receive antenna. The computation modules 542a and 542b computes values $\hat{S}_l^{iv}(m, D_m)$ based on the set of hypothesis values from the look-up table 510 and the channel weights generated by the channel estimation modules 532a and 532b. $\hat{S}_l^{iv}(m, D_m)$ can be expressed in the following equation:

$$\hat{S}_l^{iv}(m, D_m) = \Sigma_l \hat{C}_l^{\ell iH}(m)\{f^v(D,m) - D_m X^{\ell H}(m) X^v(m)\},$$

where $\hat{C}_l^{\ell iH}(m)$ represents the estimated channel weight corresponding to the communication link between lth transmit antenna and ith receive antenna, and $f^{\ell v}(D, m)$ represents the hypothesis values from the look-up table 510. The scaling factor $\sqrt{P}$ is included in the channel estimate. These channel weights are normally estimated using the transmit antenna specific reference symbols transmitted over each of the transmit antennae.

The adder module 534 multiples $\hat{S}_l^{iv}(m, D_m)$ with $-1$ and then adds it with the output of the evaluation module 508, denoted as $S_l^{iv}(m)$. The sum module 536 takes the absolute values of the output from the adder module 534, square them, and sum them over all i and v values. The log-max-sum module 538 multiplies the output of the sum module 536 with $$\frac{1}{2\sigma_n^2},$$

where $\sigma_n^2$ is the estimated noise variance and $\sigma_n^2 = E[|N'_l(m)|^2]$. The log-max-sum module 538 takes the exponential sum over all values of D to generate $\Lambda(D_m=+1)$ and $\Lambda(D_m=-1)$. The select max module 540 determines the HARQ indicator by determines the most probable value of $D_m$ as the one which corresponds the max value between $\Lambda(D_m=+1)$ and $\Lambda(D_m=-1)$. That is, $D_m$ is selected as a 1 if $\Lambda(D_m=+1) > \Lambda(D_m=-1)$ and $D_m=-1$ otherwise.

The exponential sum over all the values of D can be obtained in a computationally efficient manner by employing log-max formulation as follows:

For example, $\Lambda = \Sigma_{i=0}^{N-1} \exp(x_i) \propto \ln[\Sigma_{i=0}^{N-1} \exp(x_i)]$ can be written as $$\Lambda \propto x_j + \ln\left[1 + \sum_{\substack{i=0\\i\neq j}}^{N-1} \exp(-(x_j - x_i))\right]$$

where $x_j = \max\{x_i, i=0, 1, \ldots, N-1\}$. This formulation can be written recursive fashion considering two quantities at a time. The advantage with this formulation is the second term in the above equation $\ln(1+\exp(-x_j+x_i))$ can be represented by a simple Look-up-table. The quantity $\ln(1+\exp(-x_j+x_i))$ falls in the range 0 and $\ln(2)$, which can be represented by as few as 7 values for different quantized values of $|x_j-x_i|$ without loss in performance.

The following equation describes example calculations performed by the ML detector 530:

$$\Lambda(D_m = \pm 1) \propto p(S_l^{iv}(m), \forall\, i, v \mid D_m)$$

$$= \sum_{\forall D} p(S_l^{iv}(m), \forall\, i, v \mid \{D_m, D\})$$

where $$D = \{D_0, D_1, \ldots, D_{m-1}, D_{m+1}, \ldots, D_7\}.$$

$$p(S_l^{iv}(m), \forall\, i, v \mid D_m) = \prod_i \prod_v p(S_l^{iv}(m) \mid D_m)$$

$$\Lambda(D_m = \pm 1) =$$

$$\sum_{\forall D} \exp\left\{-\frac{\sum_i \sum_v \left| S_l^{iv}(m) - \sqrt{P}\sum_{\ell} C_l^{\ell iH}(m)\left\{\sum_{\substack{k=0\\k\neq m}}^{7} D_k X^{\ell H}(k) X^v(m) \mp X^{\ell H}(m) X^v(m)\right\}\right|^2}{2\sigma_n^2}\right\}$$

-continued $$\Lambda(D_m = \pm 1) =$$

$$\sum_{\forall D} \exp\left\{-\frac{\sum_i \sum_v \left|S_l^{iv}(m) - \sqrt{P}\sum_\ell C_l^{\ell iH}(m)\{f^{\ell v}(D,m) \mp X^{\ell H}(m)X^v(m)\}\right|^2}{2\sigma_n^2}\right\}$$

where $$f^{\ell v}(D, m) = \sum_{\substack{k=0 \\ k \neq m}}^{7} D_k X^{\ell H}(k) X^v(m)$$

For clarity, the above equations can be expressed as follows:

$$\Lambda(D_m = +1) = \sum_{\forall D} \exp\left\{-\frac{\sum_i \sum_v \left|S_l^{iv}(m) - \hat{S}_l^{iv}(m, D_m = +1)\right|^2}{2\sigma_n^2}\right\}$$

$$\Lambda(D_m = -1) = \sum_{\forall D} \exp\left\{-\frac{\sum_i \sum_v \left|S_l^{iv}(m) - \hat{S}_l^{iv}(m, D_m = -1)\right|^2}{2\sigma_n^2}\right\}$$

In the illustrated example, the look up table 510 stores a set of hypothesis values. Because hypothesis values $f^{\ell v}(D, m)$ are only dependent on $X^0$, $X^1$, and the possible values of the HARQ indicators for all the other 7 UEs in the same PHICH group with the UE, the hypothesis values can be pre-computed by the UE and stored in the look-up table 510. In some implementations, a UE pre-computes hypothesis values $f^{\ell v}(D, m)$ and stores them in the look-up table 510. The look-up table 510 may be stored in a memory of the UE.

VI. Exemplary Hypothesis Value Technique

Figures 6, 7:
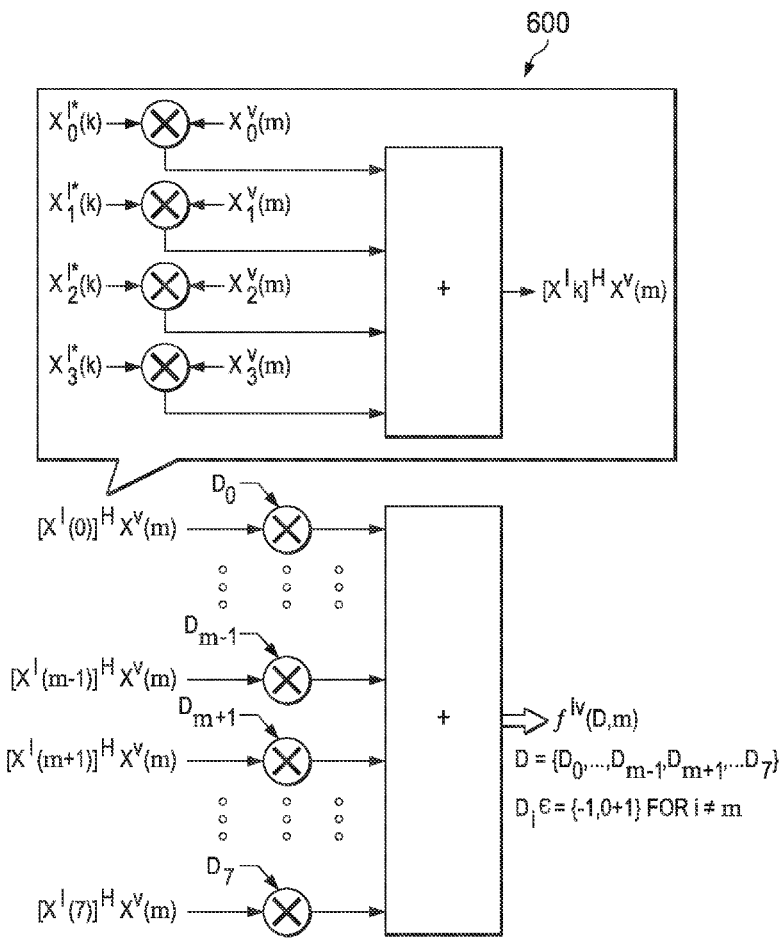
FIG. 6 is a schematic illustrating example computations for generating hypothesis values.
FIG. 7 is a schematic illustrating example Orthogonal Cover Codes (OCCs) that have non-zero covariance values with a predetermined OCC.

FIG. 6 is a schematic 600 illustrating example computations for generating hypothesis values $f^{\ell v}(D, m)$. Here, k denotes indices of the other seven UEs, where k=0 . . . 7, k≠m. Multiplication of $X^{\ell H}(k)$ and $X^v(m)$ for each k generates $[X^\ell(k)]^H X^v(m)$. $D_i$ denotes the state of HARQ symbols for UE-i. As described previously, $D_i$ can take one of three values: −1, 0, and 1. Therefore hypothesis values $f^{\ell v}(D, m)$ can be calculated by multiplying $[X^\ell(k)]^H X^v(m)$ with $D_i$ for each k and each possible state of $D_i$.

In some implementations, a reduced set of hypothesis values may be derived by exploiting the property of OCCs. For example, for each m, instead of including $3^7$ hypothesis values based on each of the three possible states for each of the other seven UEs in the PHICH group, the look-up table 510 may include only $3^3$ entries. An OCC matrices $X^0$ and the SFBC coded version of the OCC matrix $X^1$ are defined as the following:

$$X^0 = \begin{bmatrix} 1 & 1 & 1 & 1 \\ 1 & -1 & 1 & -1 \\ 1 & 1 & -1 & -1 \\ 1 & -1 & -1 & 1 \\ j & j & j & j \\ j & -j & j & -j \\ j & j & -j & -j \\ j & -j & -j & j \end{bmatrix}^T$$

and $$X^1 = \begin{bmatrix} -1 & 1 & -1 & 1 \\ 1 & 1 & 1 & 1 \\ -1 & 1 & 1 & -1 \\ 1 & 1 & -1 & -1 \\ j & -j & j & -j \\ -j & -j & -j & -j \\ j & -j & -j & j \\ -j & -j & j & j \end{bmatrix}^T$$

A closer look at the cross covariance values of $X^0$ and $X^1$ with vector $X^0(m)$ and $X^1(m)$ reveals that there are only three non-zero cross covariance values (instead of seven) for any m, where $X^0(m)$ denotes the predetermined OCC for the UE-m and $X^1(m)$ denotes the SFBC coded version of the predetermined OCC for the UE-m. Therefore, for any m, the look-up table 510 only needs to include $3^3$ hypothesis values. In some implementations, the look-up table 510 includes eight rows. Each row corresponds to one m. The look-up table 510 includes twenty-seven columns. Each column includes one of the $3^3$ hypothesis values in the reduced set of hypothesis values. This significantly reduces the complexity of a UE.

VII. Exemplary Technique for Reducing Hypothesis Values

FIG. 7 is a schematic 700 illustrating example OCCs that have non-zero cross covariance values with a predetermined OCC. For example, if the predetermined OCC is OCC-0, only OCC-1, OCC-4, and OCC-5 have non-zero cross covariance values with OCC-0. The following equations describe a cross covariance calculation of $X^0$ and $X^1$ with vector $X^0(0)$ and $X^1(0)$:

$$X^{0H}X^0(0) = [4\ 0\ 0\ 0\ -4j\ 0\ 0\ 0]^T$$

$$X^{1H}X^0(0) = [0\ 4\ 0\ 0\ 0\ 4j\ 0\ 0]^T$$

$$X^{0H}X^1(0) = [0\ -4\ 0\ 0\ 0\ 4j\ 0\ 0]^T$$

$$X^{1H}X^1(0) = [4\ 0\ 0\ 0\ 4j\ 0\ 0\ 0]^T$$

To determine a HARQ indicator that is spreaded by OCC-0, the ML detector 530 evaluates a reduced set of hypothesis values, based on all three possible states for OCC-1, OCC-4, and OCC-5. Therefore, twenty-seven hypothesis values for m=0 that nare stored in the look-up table 510. This reduces processing time and computation complexity of HARQ indicator determinations for a UE. In some implementations, a UE separates received PHICH modulation symbols and evaluates them separately.

VIII. Exemplary HARQ Indicator Determination Techniques

FIG. 8 is a schematic 800 illustrating technique for determining HARQ indicators. A UE may use the example HARQ indicator determination model 800 to determine a HARQ indicator. The example HARQ indicator determination model 800 can include any software, hardware, or firmware that determines HARQ indicators. In the illustrate example, the example HARQ indicator determination model 800 includes receive antennae 802a and 802b, RF front end receive modules 804a and 804b, descramble modules 812a and 812b, separation modules 806a and 806b, an evaluation module 808, a look-up table 810, and a ML detector 830.

In the illustrated example, the receive antennae 802a and 802b receives DL signals transmitted by a Pico eNB. The receive antennae 802a and 802b are generally responsible for receiving radio waves, and can serve as interfaces between a UE and the wireless channel. The receive antennae 802a and 802b may be transducers which can receive electromagnetic waves. The receive antennae 802a and 802b can convert electromagnetic radiation into electric current. A UE may use other number of receive antennae to receive DL signals, and include a different number of modules in the example HARQ indicator determination model 800 accordingly. For example, if a UE uses four receive antennae, then the UE may include four RF front end receive modules and four separation modules.

The RF front end receive modules 804a and 804b covert received signals into baseband signals and apply FFT process. The components of the RF front end receive modules 804a and 804b may include analog-to-digital converters, amplifiers, frequency filters, oscillators, and digital signal processing (DSP) circuitries.

The descramble module 812a and 812b use the cell specific scrambling sequence $U_l$ to descramble the outputs from the RF front end receive modules 804a and 80b to generate received PHICH modulation symbols 824a and 824b.

In the illustrated example, the separation module 806a receives the received PHICH modulation symbols 824a and separates them into multiple data streams. As previously mentioned, some of the received PHICH modulation symbols 824a may be transmitted concurrently with CRS transmissions from a neighboring cell on the same subcarriers, and thus these received PHICH modulation symbols include interference from CRS transmissions. On the other hand, other received PHICH modulation symbols include substantially no interference from CRS transmissions because they are not transmitted concurrently with CRS transmissions from the neighboring cell. A UE can improve the performance of HARQ indicator determination by separately evaluating received PHICH modulation symbols that include interference from CRS transmissions and received PHICH modulation symbols that include substantially no interference from CRS transmissions. A UE can scale the separate evaluations appropriately to reduce the impact of interference from CRS transmissions.

There are a number of ways to separate the received PHICH modulation symbols 824a into two data streams: (1) received PHICH modulation symbols that include interference from CRS transmissions, and (2) received PHICH modulation symbols that include substantially no interference from CRS transmissions. For example, the separation module 806a may compare the received power of the received PHICH modulation symbols 824a. If some received PHICH modulation symbols have substantially lower received power than other received PHICH modulation symbols, the separation module 806a may put received PHICH modulation symbols with lower received power into one data stream and put the remaining received PHICH modulation symbols into another data stream.

Another way to separate the received PHICH modulation symbols 824a is based on their positions in REGs. As previously mentioned, if a neighboring Macro cell uses two transmit antennae and transmits CRS on both Macro cell Reference Symbol RE for antenna port-0 432 and Macro cell Reference Symbol RE for antenna port-1 434, then two of the four PHICH REs in a PHICH REG will be interfered with by CRS transmissions. The interfered REs may be the PHICH REs that are used to transmit the first and the third PHICH modulation symbols, as shown in FIG. 4. They may also be the PHICH REs that are used to transmit the second and the fourth PHICH modulation symbols. Therefore, the separation module 806a may separate the received PHICH modulation symbols 824a into two data streams: an even data stream and an odd data stream. The odd data stream includes received PHICH modulation symbols transmitted on the odd positions in the PHICH REGs, i.e., the first and the third PHICH modulation symbols in the PHICH REG. The even data stream includes received PHICH modulation symbols transmitted on the even positions in the PHICH REGs, i.e., the second and the fourth PHICH modulation symbols in the PHICH REG. Therefore, one data stream includes received PHICH modulation symbols that include interference from CRS transmissions, and the other data stream includes received PHICH modulation symbols that include substantially no interference from CRS transmissions. The separation modulate 806a may compare the received power of the received PHICH modulation symbols in the two data streams to determine which data stream includes interference from CRS transmission. The separation modulate 806a may also skip the comparing step to reduce complexity of a UE. As long as these two data streams are separately evaluated and scaled, the impact of CRS transmission interference is reduced.

Separating received PHICH modulation symbols based on their positions in REGs can also work in the scenario that a Macro cell eNB only transmits on one antenna and thus transmits CRS only on the Reference Symbol RE for antenna port-0 432. In this case, only one of four PHICH REs interferes with CRS transmission. By separating received PHICH modulation symbols into an even data steam and an odd data steam, the evaluation module 806a may ensure that one data steam includes received PHICH modulation symbols that include substantially no interference from CRS transmissions. For the other data steam, half of the received PHICH modulation symbols include interference from CRS transmissions and the remaining half of the received PHICH modulation symbols include substantially no interference from CRS transmissions. Thus, separately evaluating these two data streams and scaling them may improve the performance of HARQ indicator determinations. Although the improvement may not be as significant as the case where the Macro cell eNB uses two transmit antennae, implementing one method that works for multiple scenarios may reduce complexity of a UE. Alternatively, the REs can be segregated into two streams one containing one RE and other containing 3 REs with a REG. The first stream contains the PHICH modulation symbols which are affected by the CRS interference and the second stream contains the PHICH modulation symbols which are not affected by the CRS interference.

In the illustrated example, the separation module 806*a* separates the received PHICH modulation symbols 824*a* into an even data steam and an odd data steam as described previously. In the illustrated example, a Pico cell eNB uses SFBC to transmit PHICHs over two transmit antennae, thus the separation module 806*a* duplicates the signals in each data stream for each transmit antenna so that the evaluation module 808 can evaluate the signals in each data steam for each transmit antenna. A UE may use other combinations of modules to implement the method described above. For example, a UE may implement a separation modulate to produce one copy of signals in each data stream, and use an evaluation module to duplicate the signals in each data stream before evaluating them for each transmit antenna.

In the illustrated example, the separation module 806*b* separates the received PHICH modulation symbols 824*b* in a similar way as the separation module 806*a*.

In the illustrated example, the evaluation module 808 evaluates each data steam of received PHICH modulation symbols by passing them through a filter bank. At high level, the filter bank includes filters that are matched to $X^{0e}(m)$, $X^{0o}(m)$, $X^{1e}(m)$, and $X^{1o}(m)$, respectively. $X^0(m)$ denotes the predetermined OCC for the UE-m, where m denotes the index of the predetermined OCC for the UE-m in the OCC matrix E. $X^1(m)$ denotes the SFBC coded version of the predetermined OCC for the UE-m. $X^0e(m)$ denotes the elements at the even position of $X^0(m)$. $X^{0o}(m)$ denotes the elements at the odd position of $X^0(m)$. $X^{1e}(m)$ denotes the elements at the even position of $X^1(m)$. $X^{1o}(m)$ denotes the elements at the odd position of $X^1(m)$. $X^{0e}(m)$, $X^{0o}(m)$, $X^{1e}(m)$ and $X^{1o}(m)$ can be expressed as $X^{ve}(m)$ and $X^{vo}(m)$, where v indicates the indices of the transmit antenna and v=0, 1. The outputs of the evaluation module 808 can be expressed as $S_l^{iv(e)}(m)$ and $S_l^{iv(o)}(m)$, which represent the even elements and the odd elements of $S_l^{iv}(m)$, respectively. The following equation describes $S_l^{iv}(m)$:

$$S_l^{iv}(m) = R_l^{iH}(m)\begin{bmatrix} U_l & 0 \\ 0 & U_l \end{bmatrix}X^v(m).$$

In the illustrated example, a look-up table 810 provides a set of hypothesis values to the ML detector 830. As described previously, A UE may pre-compute these hypothesis values and store them in the look-up table 810. The look-up table 810 may be stored in a memory of the UE. For each OCC-m, the following equations describe the hypothesis values corresponding to the even data steam and the odd data steam, denoted as $f^{iv(e)}(D, m)$ and $f^{iv(o)}(D, m)$, respectively:

$$f^{iv(e)}(D, m) = \sum_{\substack{k=0 \\ k \neq m}}^{7} D_k X^{i(e)H}(k) X^{v(e)}(m)$$

$$f^{iv(o)}(D, m) = \sum_{\substack{k=0 \\ k \neq m}}^{7} D_k X^{i(o)H}(k) X^{v(o)}(m)$$

As described previously, the look-up table 810 may store a reduced set of hypothesis values. The reduced set of hypothesis values may be derived by exploiting the property of OCCs. For any OCC-m, the ML detector only needs to evaluate a reduced set of hypothesis values, based on all the possible states of three other OCCs. Therefore, for any m, the look-up table 810 only needs to include $3^3$ hypothesis values. In some implementations, the look-up table 810 includes eight rows. Each row corresponds to one OCC. The look-up table 810 includes twenty-seven columns. Each column includes one of the $3^3$ hypothesis values needed to be evaluated by the ML detector 830. In the illustrated example, because the example HARQ indicator determination model 800 separates received PHICH modulation symbols into an even data stream and an odd data stream, each hypothesis value includes a value for the odd data steam and a value for the even data steam.

In the illustrated example, the ML detector 830 determines a HARQ indicator of the UE based on $S_l^{iv(e)}(m)$, $S_l^{iv(o)}(m)$, and hypothesis values $f^{iv(e)}(D, m)$ and $f^{iv(o)}(D, m)$. The ML detector 830 includes channel estimation modules 832*a* and 832*b*, computation modulate 842*a* and 842*b*, an adder modulation 834, a sum module 836, a log-max-sum module 838, and a select max module 840. The channel estimation modules 832*a* and 832*b* estimate the channel between lth transmit antenna and ith receive antenna. The computation modules 842*a* and 842*b* computes the values $\hat{S}_l^{iv(e)}(m, D_m)$ and $\hat{S}_l^{iv(o)}(m, D_m)$ based on the hypothesis values $f^{iv(e)}(D, m)$ and $f^{iv(o)}(D, m)$, and the channel weights generated by the channel estimation modules 832*a* and 832*b*. The adder module 834 multiples $\hat{S}_l^{iv(e)}(m, D_m)$ and $\hat{S}_l^{iv(o)}(m, D_m)$ with −1 and then adds them with corresponding outputs of the evaluation module 808. The sum module 836 takes the absolute values of the outputs from the adder module 834, square them, and sum them over all i and v values. The log-max-sum module 838 multiplies the output of the sum module 836 with $$\frac{1}{2\alpha_e \sigma_n^2}$$

and $$\frac{1}{2\alpha_o \sigma_n^2},$$

respectively. $\alpha_e \sigma_n^2$ is the estimated noise power spectral density over the even numbered REs, and $\alpha_o \sigma_n^2$ is the estimated noise power spectral density over the odd numbered REs. In the illustrated example, because PHICH modulation symbols in the even data stream and in the odd data stream may include different levels of interference from CRS transmissions, the estimated noise power spectral density over these two data streams are different. By multiplying the evaluation outputs for different data streams with different scaling factors, a UE improves the performance of HARQ indicator determination process. The log-max-sum module 838 takes the exponential sum over all values of D to generate $\Lambda(D_m=+1)$ and $\Lambda(D_m=-1)$. The select max module 840 determines the HARQ indicator by selecting the max value between $\Lambda(D_m=+1)$ and $\Lambda(D_m=-1)$.

The following equation describes example calculations performed by the ML detector 830:

$$\Lambda(D_m = \pm 1) \propto p(S_l^{iv}(m), \forall\, i, v \mid D_m)$$

$$= \sum_{\forall D} p(S_l^{iv}(m), \forall\, i, v \mid \{D_m, D\})$$

$$= \sum_{\forall D} \exp\left\{-\frac{\sum_i \sum_v \left| S_l^{iv(e)}(m) - \sqrt{P} \sum_\ell C_l^{i\ell(e)H}(m)\{f^{\ell v(e)}(D, m) \mp D_m X^{\ell(e)H}(m) X^{v(e)}(m)\} \right|^2}{2\alpha_e \sigma_n^2}\right\} +$$

$$\sum_{\forall D} \exp\left\{-\frac{\sum_i \sum_v \left| S_l^{iv(o)}(m) - \sqrt{P} \sum_\ell C_l^{i\ell(o)H}(m)\{f^{\ell v(o)}(D, m) \mp D_m X^{\ell(o)H}(m) X^{v(o)}(m)\} \right|^2}{2\alpha_o \sigma_n^2}\right\}$$

Figure 9:
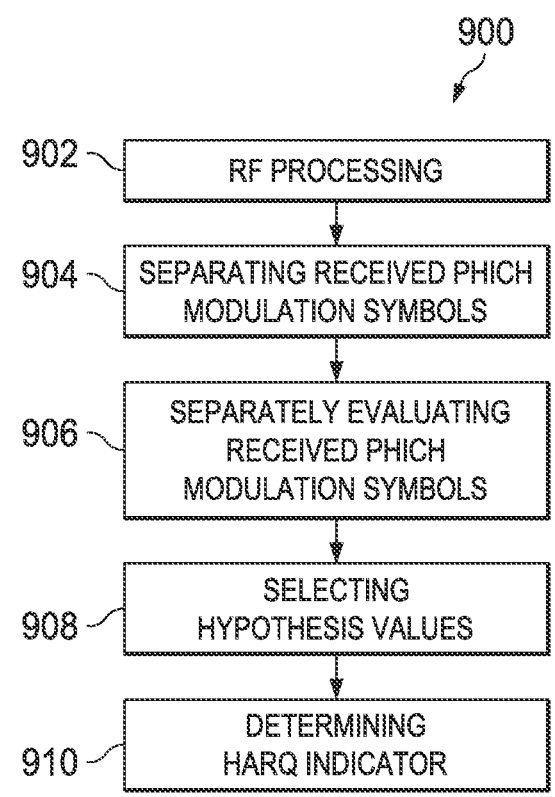
FIG. 9 is a flowchart illustrating an example HARQ indicator determination process at a UE.

FIG. 9 is a flowchart 900 illustrating a HARQ indicator determination process at a UE. The flowchart 900 begins at step 902 where the UE receives DL signals and performs Radio Frequency (RF) processing to extract received PHICH modulation symbols. Next, at step 904, the UE separates the received PHICH modulation symbols into two data streams: (1) PHICH modulation symbols including interference from CRS transmissions; and (2) PHICH modulation symbols including substantially no interference from the CRS transmissions. In some implementations, the UE separates received PHICH modulation symbols based on positions of the received PHICH modulation symbols in REGs. In some implementations, the UE separates the received PHICH modulation symbols based on relative comparisons of received powers for the received PHICH modulation symbols. In some other implementations, the UE separates the received PHICH symbols based on relative comparisons of the estimated interference powers for the received PHICH modulation symbols. For example, the interference power can be estimated by comparing the PHICH symbol power with respect to the power of the channel weight, which is estimated over the reference symbol. At step 906, the UE separately evaluates the received PHICH modulation symbols in different data streams. In some implementations, the UE evaluates the received PHICH modulation symbols in each data stream by generating outputs based on the received PHICH modulation symbols in the respective data stream and a predetermined OCC for the UE. In some implementations, the UE generates the outputs based on a precoding matrix. The precoding matrix represents the MIMO technique that an eNB uses to transmit HARQ indicators. One example of the MIMO techniques is SFBC. At step 908, the UE selects hypothesis values for HARQ indicator determinations. In some implementations, the UE selects a reduced set of hypothesis values based on the predetermined OCC for the UE. In some implementations, the reduced set of hypothesis values corresponding to OCCs that have non-zero cross covariance values with the predetermined OCC for the UE. In some implementations, the UE pre-computes the reduced set of hypothesis values and stores them in a look-up table. At step 910, the UE determines the HARQ indicator based on the separate evaluations of the received PHICH modulation symbols and the hypothesis values.

IX. Exemplary Embodiments

In one aspect, a user equipment (UE)-implemented method for Hybrid Automatic Repeat Request (HARQ) indicator detection may be provided. The method may include (a) separating received Physical HARQ Indicator Channel (PHICH) modulation symbols into two data streams: (1) PHICH modulation symbols including interference, and (2) PHICH modulation symbols including no or substantially no interference; (b) separately evaluating the PHICH modulation symbols including interference and the PHICH modulation symbols including no or substantially no interference; and/or (c) determining a Hybrid ARQ indicator for a UE based upon a combination of the separate evaluations of the PHICH modulation symbols including interference and the PHICH modulation symbols including no or substantially no interference. The method may include additional, fewer, or alternate actions, including those discussed elsewhere herein.

For instance, the separating of the received PHICH modulation symbols may be based on (1) relative comparisons of received powers for the received PHICH modulation symbols; (2) the relative comparisons of estimated interference powers for the received PHICH modulation symbols; and/or (3) the positions of the received PHICH modulation symbols in Resource Element Groups (REGs). Separately evaluating the received PHICH modulation symbols may include generating a first set of outputs based on both the received PHICH modulation symbols including interference and a predetermined orthogonal cover code for the UE; and/or generating a second set of outputs based on both the received PHICH modulation symbols including no or substantially no interference and the predetermined orthogonal cover code for the UE. Determining the Hybrid ARQ indicator for the UE may be based on (i) the first set of outputs, (ii) the second set of outputs, and (iii) comparing with a reduced set of hypothesis values. The first set and the second set of outputs may be formed from the received PHICH modulation symbols over all the receive antennas and the OCC and transformed form of OCC. The hypothesis values may be determined based on the Hybrid ARQ indicators for other UEs that are simultaneously transmitted over the same radio resources. The comparing may include obtaining a first set of metrics, by measuring the squared Euclidean distance between the first set and corresponding reduced set of hypothesis values for Hybrid ARQ indicator equal to a minus one or a plus one; obtaining a second set of metrics, by measuring the squared Euclidean distance between the second set and corresponding reduced set of hypothesis values for Hybrid ARQ indicator equal to a minus one or a plus one; scaling the first set of metrics by a first scaled estimate of noise variance; scaling the second set of metrics by a second scaled estimate of noise variance; and computing an exponential sum of first and second set of metrics corresponding to Hybrid ARQ indicator equal to a minus one and a plus one. The exponential sum may be computed in natural logarithm using look-up tables. The first and second scaling factors may be negative numbers less than zero. The second scaling factor may be different from the first scaling. The first and second scaling factors may be dependent on the noise plus interference power estimated over the PHICH symbols with interference and the PHICH symbols with relatively no interference. The reduced set of hypothesis values may be based on the predetermined orthogonal cover code and a transformed version of the predetermined orthogonal cover code for the UE. The reduced set of hypothesis values may be stored in a pre-computed look up table.

Each of the reduced set of hypothesis values may correspond to an orthogonal cover code that has a non-zero cross covariance value with the predetermined orthogonal cover code. Generating the first outputs may be based on the predetermined orthogonal cover code, and generating second outputs may be based on a transformed version of the predetermined orthogonal cover code. The transform may be based on a Space Frequency Block Coding (SFBC) technique. The interference may be from a neighboring cell transmission or from the CRS transmissions from at least one neighboring cell.

In one aspect, a receiver of a communication network and/or a UE may be provided. The receiver may include one or more processors configured to: separate received Physical HARQ Indicator Channel (PHICH) modulation symbols into two data streams: (1) PHICH modulation symbols including interference, and (2) PHICH modulation symbols including no or substantially no interference; separately evaluate the PHICH modulation symbols including interference and the PHICH modulation symbols including no or substantially no interference; and/or determine a Hybrid ARQ indicator for a UE based upon a combination of the separate evaluations of the PHICH modulation symbols including interference and the PHICH modulation symbols including no or substantially no interference. The receiver may include additional, less, or alternate functionality, including that disclosed elsewhere herein.

In one aspect, a receiver of a communication network and/or a UE may be provided. The receiver may include (a) means for separating received Physical HARQ Indicator Channel (PHICH) modulation symbols into two data streams: (1) PHICH modulation symbols including interference, and (2) PHICH modulation symbols including no or substantially no interference; (b) means for separately evaluating the PHICH modulation symbols including interference and the PHICH modulation symbols including no or substantially no interference; and/or (c) means for determining a Hybrid ARQ indicator for a UE based upon a combination of the separate evaluations of the PHICH modulation symbols including interference and the PHICH modulation symbols including no or substantially no interference. The means for functionality noted above may include one more processors and/or computer instructions stored on non-transitory memory that direct the direct the processors to carry out the stated functionality. The receiver may include additional, less, or alternate functionality, including that disclosed elsewhere herein.

In another aspect, a user equipment (UE)-implemented method of reducing interference arising from Cell-specific Reference Symbols (CRS) transmitted by a macro cell may be provided. The method may include (1) determining at a UE which PHICH (Physical HARQ Indicator Channel) modulation symbols are interfered with by a CRS (Cell-specific Reference Symbol) transmission received at the UE; (2) separately evaluating at the UE (a) the PHICH modulated symbols that are interfered with by the CRS transmission, and (b) the PHICH modulated symbols that are not interfered with by the CRS transmission; and/or (3) combining the separate evaluations after scaling them appropriately such that the effects of CRS interference may be alleviated at the UE. The method may include additional, fewer, or alternate actions, including those discussed elsewhere herein.

In another aspect, a user equipment (UE)-implemented method of reducing interference arising from Cell-specific Reference Symbols (CRS) transmitted by a macro cell, may be provided. The method may include (1) determining at a UE which PHICH (Physical HARQ Indicator Channel) modulation symbols are interfered with by a CRS (Cell-specific Reference Symbol) transmission received at the UE; (2) separately evaluating at the UE (a) the PHICH modulated symbols that are interfered with by the CRS transmission, and (b) the PHICH modulated symbols that are not interfered with by the CRS transmission; and/or (3) combining the separate evaluations after scaling them appropriately such that the effects of CRS interference are alleviated at the UE. The UE may determine which PHICH modulation symbols are CRS interfered with by relative comparison of the received powers over different modulation symbols. The UE-implemented method may include additional, fewer, or alternate actions, including those discussed elsewhere herein.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a signal software product or packaged into multiple software products.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps not implied by the order they appear in the claims.

What is claimed is:

1. A user equipment (UE)-implemented method for Hybrid Automatic Repeat Request (HARQ) indicator detection, the method comprising:
    separating received Physical HARQ Indicator Channel (PHICH) modulation symbols into two data streams: (1) PHICH modulation symbols including interference, and (2) PHICH modulation symbols including substantially no interference;

separately evaluating the PHICH modulation symbols including interference and the PHICH modulation symbols including substantially no interference, wherein separately evaluating the received PHICH modulation symbols comprises:
generating first set of outputs based on both the received PHICH modulation symbols including interference and a predetermined orthogonal cover code for the UE; and
generating second set of outputs based on both the received PHICH modulation symbols including substantially no interference and the predetermined orthogonal cover code for the UE; and
determining a Hybrid ARQ indicator for a UE based upon a combination of the separate evaluations of the PHICH modulation symbols including interference and the PHICH modulation symbols including substantially no interference, wherein determining the Hybrid ARQ indicator for the UE is based on the first set of outputs, the second set of outputs, and comparing with a reduced set of hypothesis values.

2. The method of claim 1, where in the first set and the second set of outputs formed from the received PHICH modulation symbols over all the receive antennas and the OCC and transformed form of OCC.

3. The method of claim 1, wherein the hypothesis values are determined based on the Hybrid ARQ indicators for other UEs simultaneously transmitted over the same radio resources.

4. The method of claim 1, wherein the comparing comprises;
obtaining a first set of metrics, by measuring the squared Euclidean distance between the first set and corresponding reduced set of hypothesis values for Hybrid ARQ indicator equal to a minus one or a plus one;
obtaining second set of metrics, by measuring the squared Euclidean distance between the second set and corresponding reduced set of hypothesis values for Hybrid ARQ indicator equal to a minus one or a plus one;
scaling the first set of metrics by a first scaled estimate of noise variance;
scaling the second set of metrics by a second scaled estimate of noise variance; and
computing an exponential sum of first and second set of metrics corresponding to Hybrid ARQ indicator equal to a minus one and a plus one.

5. The method of claim 4, wherein the exponential sum computed in natural logarithm using look-up tables.

6. The method claim 4, wherein the first and second scaling factors are negative numbers less than zero.

7. The method of claim 4, wherein the second scaling factor is different from the first scaling.

8. The method of claim 7, wherein the first and second scaling factors dependent on the noise plus interference power estimated over the PHICH symbols with interference and the PHICH symbols with relatively no interference.

9. The method claim 1, wherein the reduced set of hypothesis values is based on the predetermined orthogonal cover code and a transformed version of the predetermined orthogonal cover code for the UE.

10. The method of claim 1, wherein the reduced set of hypothesis values are stored in a pre-computed look up table.

11. The method of claim 1, wherein each of the reduced set of hypothesis values corresponds to an orthogonal cover code that has a non-zero cross covariance value with the predetermined orthogonal cover code.

12. The method of claim 1, wherein generating the first outputs is based on the predetermined orthogonal cover code, and generating second outputs is based on a transformed version of the predetermined orthogonal cover code.

13. The method of claim 12, wherein the transform is based on a Space Frequency Block Coding (SFBC) technique.

14. The method of claim 1, wherein the interference is from a neighboring cell transmission.

15. The method of claim 1, wherein the interference is from the CRS transmissions from at least one neighboring cell.

16. A receiver of a communication network, comprising:
one or more processors configured to:
separate received Physical HARQ Indicator Channel (PHICH) modulation symbols into two data streams: (1) PHICH modulation symbols including interference, and (2) PHICH modulation symbols including substantially no interference;
separately evaluate the PHICH modulation symbols including interference and the PHICH modulation symbols including substantially no interference, wherein separately evaluating the received PHICH modulation symbols comprises:
generating first set of outputs based on both the received PHICH modulation symbols including interference and a predetermined orthogonal cover code for the UE; and
generating second set of outputs based on both the received PHICH modulation symbols including substantially no interference and the predetermined orthogonal cover code for the UE; and
determine a Hybrid ARQ indicator for a UE based upon a combination of the separate evaluations of the PHICH modulation symbols including interference and the PHICH modulation symbols including substantially no interference, wherein determining the Hybrid ARQ indicator for the UE is based on the first set of outputs, the second set of outputs, and comparing with a reduced set of hypothesis values.

17. A user equipment (UE)-implemented method of reducing interference arising from Cell-specific Reference Symbols (CRS) transmitted by a macro cell, the method comprising:
determining at a UE which PHICH (Physical HARQ Indicator Channel) modulation symbols are interfered with by a CRS (Cell-specific Reference Symbol) transmission received at the UE;
separately evaluating at the UE (a) the PHICH modulated symbols that are interfered with by the CRS transmission, and (b) the PHICH modulated symbols that are not interfered with by the CRS transmission, wherein separately evaluating the PHICH modulation symbols comprises:
generating first set of outputs based on both the PHICH modulation symbols that are interfered with by the CRS transmission and a predetermined orthogonal cover code for the UE; and
generating second set of outputs based on both the PHICH modulation symbols that are not interfered with by the CRS transmission and the predetermined orthogonal cover code for the UE; and
determine a Hybrid ARQ indicator for a UE based upon a combination of the separate evaluations after scaling them, wherein determining the Hybrid ARQ indicator for the UE is based on the first set of outputs, the second set of outputs, and comparing with a reduced set of hypothesis values.

* * * * *